US012694511B2

(12) United States Patent
Blanchet et al.

(10) Patent No.: US 12,694,511 B2
(45) Date of Patent: Jul. 28, 2026

(54) SYSTEM FOR PROCESSING A WHOLE SLIDE IMAGE, WSI, OF A BIOPSY

(71) Applicant: KONINKLIJKE PHILIPS N.V., Eindhoven (NL)

(72) Inventors: Lionel Michel Blanchet, Eindhoven (NL); Laurie Bax, Eindhoven (NL); Carlos Sànchez Sànchez C, Eindhoven (NL); Duygu Buyukaydin, Eindhoven (NL); Wen-Yang Chu, Hasselt (BE); Anja Van Gestel, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 363 days.

(21) Appl. No.: 17/797,738

(22) PCT Filed: Jan. 27, 2021

(86) PCT No.: PCT/EP2021/051781
§ 371 (c)(1),
(2) Date: Aug. 5, 2022

(87) PCT Pub. No.: WO2021/156109
PCT Pub. Date: Aug. 12, 2021

(65) Prior Publication Data
US 2023/0081707 A1 Mar. 16, 2023

(30) Foreign Application Priority Data
Feb. 7, 2020 (EP) ...................................... 20156178

(51) Int. Cl.
*G06T 7/00* (2017.01)
*G06V 20/69* (2022.01)

(52) U.S. Cl.
CPC ............ *G06T 7/0012* (2013.01); *G06V 20/69* (2022.01); *G06T 2207/10024* (2013.01); *G06T 2207/20044* (2013.01); *G06T 2207/30024* (2013.01)

(58) Field of Classification Search
CPC ......... G06T 7/0012; G06T 2207/10024; G06T 2207/20044; G06T 2207/30024; G06V 20/69
See application file for complete search history.

(56) References Cited

U.S. PATENT DOCUMENTS

| | | | |
|---|---|---|---|
| 2008/0036769 A1* | 2/2008 | Coutts ..................... | G06T 11/20 345/441 |
| 2011/0293165 A1 | 12/2011 | Malon | |
| 2018/0242905 A1* | 8/2018 | Madabhushi ......... | G06F 18/241 |

FOREIGN PATENT DOCUMENTS

| | | | |
|---|---|---|---|
| CN | 108537730 | * | 9/2018 |
| CN | 108986109 A | | 12/2018 |

(Continued)

OTHER PUBLICATIONS

Machine translation for CN 108537730 (Year: 2018).*

(Continued)

*Primary Examiner* — Qian Yang

(57) ABSTRACT

A system and method is provided for processing a whole slide image, WSI, of a biopsy such as a core needle biopsy or a vacuum assisted biopsy. A skeleton of the shape of the detected tissue is created and a skeleton path is determined. An image is generated comprising a line representing the skeleton path with different line representations along the line representing different tissue pathologies. A pathology summary for the overall line is also prepared. This provides the information desired by a pathologist in a most convenient format and representation.

15 Claims, 5 Drawing Sheets

(56) References Cited

FOREIGN PATENT DOCUMENTS

| EP | 2772882 A1 | 9/2014 |
| EP | 2863204 A1 | 4/2015 |
| WO | WO 2015/166377 | * 11/2015 |

OTHER PUBLICATIONS

PCT International Search Report, International application No. PCT/EP2021/051781, May 1, 2021.

Hongming X et al., "Epidermis Segmentation in Skin Histopathological Images Based on Thickness Measurement and K-Means Algorithm", EURASIP Journal On Image and Video Processing, vol. 2015, No. 1, Jun. 23, 2015, XP055716277.

Lu C. et al., "Detection of Melanocytes in Skin Histopathological Images Using Radial Line Scanning", Pattern Recognition., vol. 46, No. 2, Aug. 8, 2012, pp. 509-518, XP055716281.

Campanella G. et al., "Clinical-Grade Computational Pathology Using Weakly Supervised Deep Learning on Whole Slide Images", Nature Medicine, vol. 25, pp. 1301-1301, Aug. 2019.

Bulten W. et al., "Automated Deep-Learning System for Gleason Grading of Prostate Cancer Using Biopsies: A Diagnostic Study", Lancet Oncology, vol. 21, pp. 233-241, Feb. 2020.

Ehteshami B. et al., "Diagnostic Assessment of Deep Learning Algorithms for Detection of Lymph Node Metastases in Women with Breast Cancer", Journal of American Medical Association (JAMA), vol. 318, No. 22, pp. 2199-2210, 2017.

Nagpal K. et al., "Development and Validation of a Deep Learning Algorithm for Improving Gleason Scoring of Prostate Cancer", npj Digital Medicine, vol. 2, No. 48, 2019.

Chen P. et al., "tissueloc: Whole Slide Digital Pathology Image Tissue Localization", Journal of Open Source Software (JOSS), vol. 4, Issue 33,1148.1-1148.3, 2019.

Srigley J.R. et al., "Prostate Gland—Protocol Applies to Invasive Carcinomas of the Prostate Gland", College of American Pathologists, 2007, Based on AJCC/UICC TNM, 6th Edition.

* cited by examiner 7 mm biopsy
80 % covered
by tumor (5.6 mm)

SYSTEM FOR PROCESSING A WHOLE SLIDE IMAGE, WSI, OF A BIOPSY

CROSS-REFERENCE TO RELATED APPLICATIONS

This patent application claims the priority benefit under 35 U.S.C. § 371 of International Patent Application no. PCT/EP2021/051781, filed Jan. 27, 2021, which claims the benefit of European Patent Application No. EP20156178.4, filed on Feb. 7, 2020. These applications are hereby incorporated by reference herein in their entirety.

FIELD OF THE INVENTION

This invention relates to the processing of whole slide images, such as for a core needle biopsy or a vacuum assisted biopsy.

BACKGROUND OF THE INVENTION

A whole slide image, WSI, is a digitized image of a glass slide sample, enabling automated detection and interpretation of the features of the tissue sample.

Current practice in computer assisted detection and/or diagnostic analysis of a whole slide image is to represent regions of interest either using simple point markers or polygons on top of the clinical image. A probability map can also be displayed, providing more information but with the disadvantage of occulting the original clinical image.

The development of digital and computational pathology enables the application of these methods to create a new field of medicine, leveraging the advantage of whole slide images (WSI). In parallel, the progress in computer vision technology and especially in deep learning have enabled the analysis of large numbers of clinical images, making it possible and useful to integrate such technology into a clinical pathology workflow.

Such automated analysis is for example already used in prostate cancer detection and grading, or the detection of breast lymph node metastasis.

In some specific cases, a medical specialist is not interested in a two-dimensional representation of the detected affected tissue area (for example as a polygon) but only in the detection along a specific axis. In particular, core needle biopsies or vacuum assisted biopsies are used to extract a column of cells, enabling analysis of a cell structure along a path of locations (such as depths) through a body of tissue. The use of biopsies in pathology follows clearly defined protocols. These protocols assume that the biopsies are mono-dimensional lengths of tissue, whose width is irrelevant for diagnostic purposes. Indeed, for core needle biopsies and vacuum assisted biopsies, the main and only relevant axis is the length of the biopsy, and most protocols advise to report the length and line coverage by tumor tissue (or other type of diseased tissue under investigation).

Displaying two dimensional detections on top of images of thin lengths of tissue, such as obtained from a core needle biopsy or vacuum assisted biopsy, is inconvenient because the view of the original samples becomes cluttered. Numerous pathologists have reported that as a hindrance to their workflow. More importantly the two dimensional information displayed does not correspond to the information that needs to be reported according to the official medical protocol, in particular a length and coverage as explained above.

It would be desirable to enable the desired information to be extracted by automated image analysis from a whole slide image, WSI.

SUMMARY OF THE INVENTION

The invention is defined by the claims.

According to examples in accordance with an aspect of the invention, there is provided a system for processing a whole slide image, WSI, of a biopsy, comprising a processor which is adapted to:

detect tissue present in the WSI relating to one biopsy;

create a skeleton of the shape of the detected tissue;

select a skeleton path as the longest continuous path through the tissue;

determine tissue pathologies of the detected tissue; and generate an image comprising:

a line representing the skeleton path with different line representations along the line representing different tissue pathologies; and a pathology summary for the overall line.

This system enables automated determination of the desired information from a biopsy, as a pathology summary relating to a line along the biopsy as well as an image representation of the line which conveys pathology information. The line is for example displayed on top of the original WSI image so that all original image content is visible as well as the summary information provided by the line. The line is essentially a one-dimensional representation of the pathology information. It is noted that the line is not generally straight, so the single dimension of the line is not straight. Furthermore, the line thickness may be varied along its length to convey pathology information (as discussed below), hence the line may have a two-dimensional component, even though it is predominantly a one-dimensional representation. This is what is meant by "essentially" one-dimensional.

The invention thus combines the use of digitized slides in pathology with the application of image analysis algorithms for skeleton detection and for pathology detection. These may for example be deep learning-based detectors (e.g. tissue and pathology detectors).

The line for example comprises a median line of the biopsy, obtained by deriving the position, form and length of the median line from a WSI of a biopsy. The pathology information (such as identification of diseased areas) is for example encoded into the line representation, and tumor coverage information for a pathology report is derived.

The display of the biopsy line representation enables a pathologist to confirm the pathology summary by assessing the quality of both tissue detection and tumor (or other tissue pathology) detection.

The different representations for example comprise different colors or line thickness. Thus, the appearance of the line is coded with information relating to the tissue pathology.

The pathology summary for example comprises a biopsy length and a fraction of the line occupied by a particular type of tissue pathology. There may be only classes of tissue pathology (diseased or not diseased) but there may be more. The pathology summary may additionally present the individual lengths which make up the portions of the line occupied by the particular type of tissue pathology. The particular type of tissue pathology is for example tumor tissue.

Generating the line may comprise overlaying the detected tissue pathologies over the skeleton path, and selecting a representative tissue pathology for each point along the skeleton path. Thus, the line conveys different pathology types.

The representative tissue pathology is for example selected to be tumor tissue if tumor tissue is present at or perpendicular to the respective point along the line. Thus, the line is for example a median line, and for detection of tumor tissue, the detection is based on the tissue at a point along the line as well as the tissue samples on each side of that point.

A first machine learning algorithm may be used for tissue detection and one or more second machine learning algorithms may be used for detecting tissue pathologies.

The system preferably further comprises a display for displaying the image, with the pathology summary alongside the line.

The invention also provides a computer-implemented method for processing a whole slide image, WSI, of a biopsy, comprising:

detecting tissue present in the WSI relating to one biopsy;

creating a skeleton of the shape of the detected tissue;

selecting a skeleton path as the longest continuous path through the tissue;

determining tissue pathologies of the detected tissue; and generating an image comprising:

a line representing the skeleton path with different line representations along the line representing different tissue pathologies; and a pathology summary for the overall line.

The method may comprise generating an image with different colors of the line representing different tissue pathologies. The method may also comprise generating a pathology summary comprising a biopsy length and a fraction of the line occupied by tumor tissue.

The image may be generated by overlaying or juxtaposing the determined tissue pathologies over the skeleton path, and selecting an associated tissue pathology for each point along the skeleton path.

The invention also provides a computer program comprising computer program code means which is adapted, when said program is run on a computer, to implement the method defined above.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
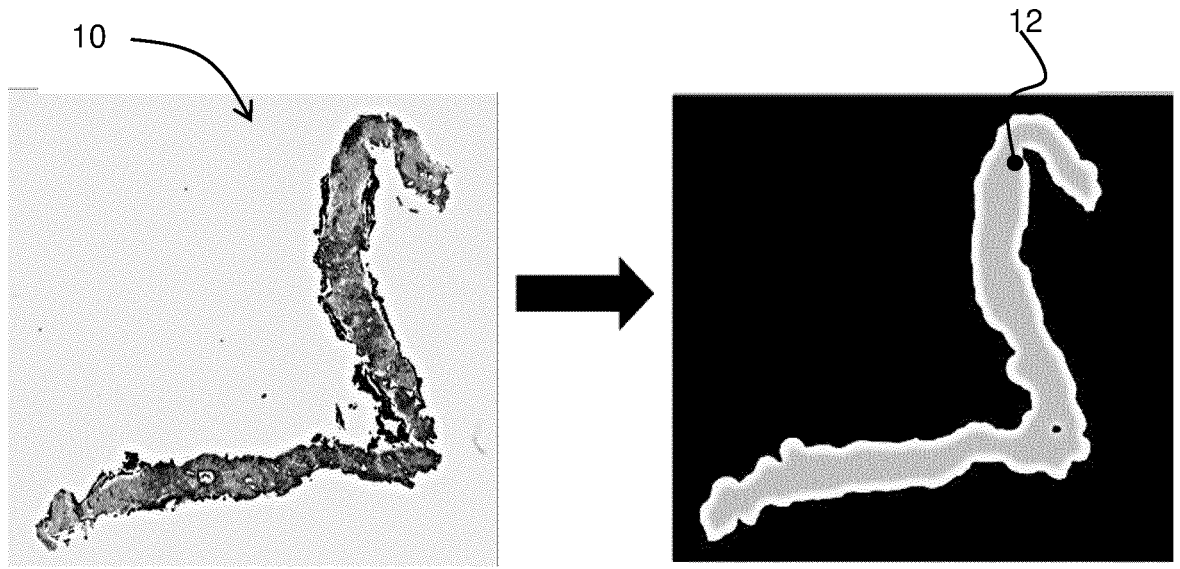
FIG. 1 shows a whole slide image of a single core needle biopsy and an area outline.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a system and method for processing a whole slide image, WSI, of a biopsy such as a core needle biopsy or a vacuum assisted biopsy. A skeleton of the shape of the detected tissue is created and a skeleton path is determined. An image is generated comprising a line representing the skeleton path with different line representations along the line representing different tissue pathologies. A pathology summary for the overall line is also prepared. This provides the information desired by a pathologist in a most convenient format and representation.

The invention relates to elongate biopsies wherein pathology information at different positions along the elongate length of the biopsy is of interest. As one example of the type of biopsy to which the invention may be applied, FIG. 1 shows on the left a whole slide image 10, WSI, of a single core needle biopsy. There may be multiple biopsies in one WSI, but the invention will be illustrated with a single biopsy in the WSI.

The steps carried out in the processing of the WSI will be discussed. These steps are carried out as image analysis steps of the WSI.

The first step is to detect all tissue present on the WSI. This creates an area outline 12 as shown in the right image in FIG. 1. If there are multiple biopsies, separate tissue regions are identified that correspond to individual biopsies, equivalent to independent samples.

Figure 2:
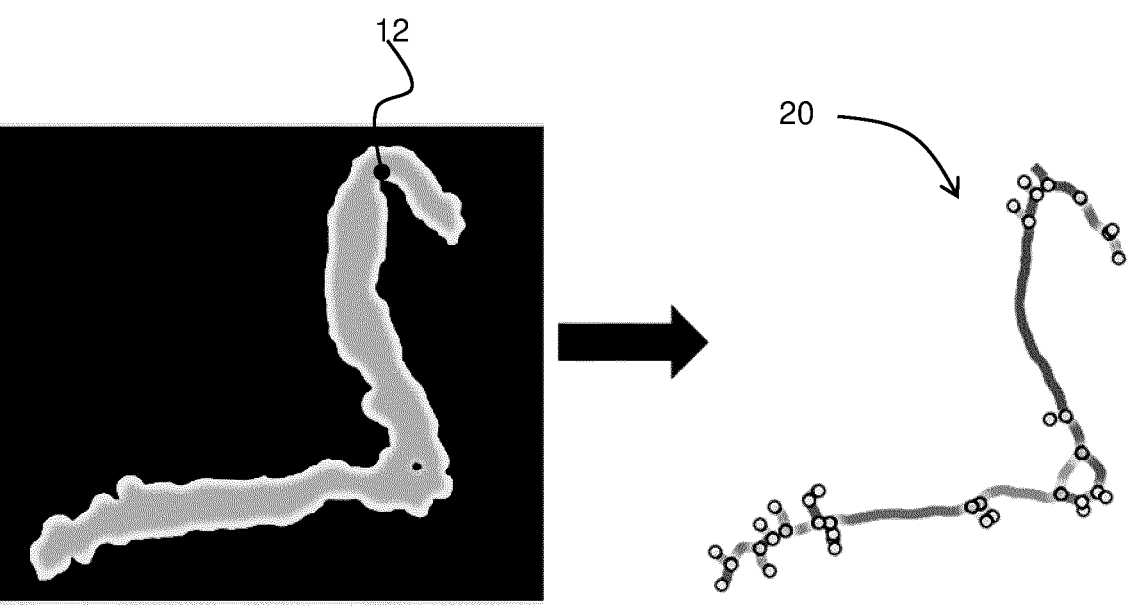
FIG. 2 shows the area outline and a skeleton.

For the identified biopsies, a skeleton 20 of the biopsy is identified as shown in FIG. 2. The left image of FIG. 2 shows the area outline 12 and the right image shows the resulting skeleton 20. The skeleton is a series of nodes and vertices joining the nodes which represent identifiable branches in the shape of the tissue sample.

Figure 3:
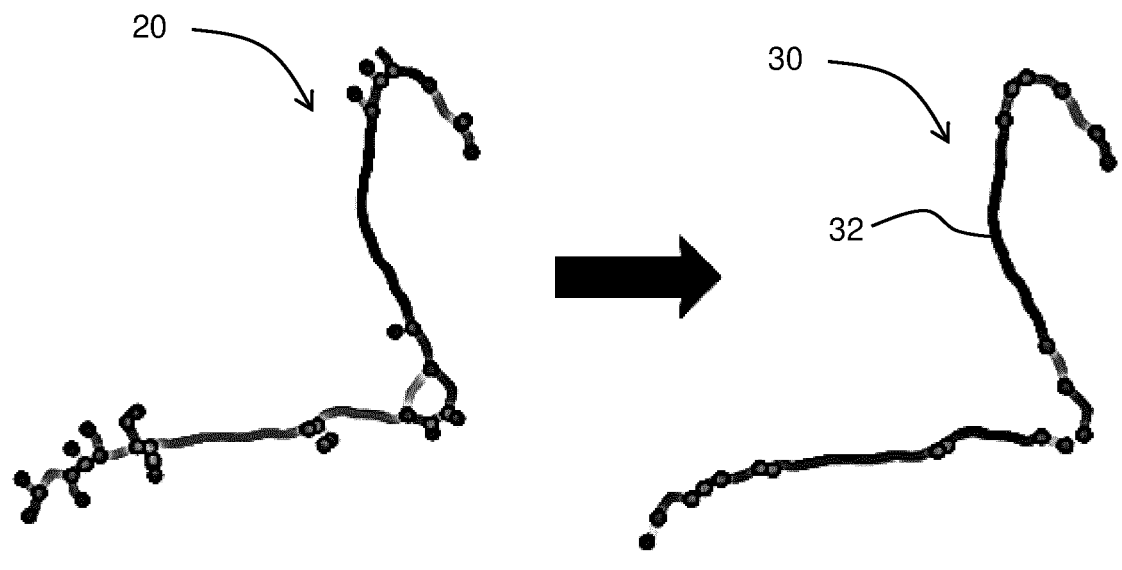
FIG. 3 shows the skeleton and a trimmed skeleton forming a skeleton path.

The skeleton is then trimmed, to remove any branches of the skeleton that differ from the longest possible path. The left image of FIG. 3 shows the skeleton 20 and the right image shows the trimmed skeleton 30. The trimmed skeleton defines a skeleton path 32 which is the longest continuous path through the tissue. It follows a median line, i.e. each point along the skeleton path 32 is at the center of the width of the sample at that point along the length of the sample.

The skeleton path 32 thus defines the full extent of the biopsy.

Figure 4:
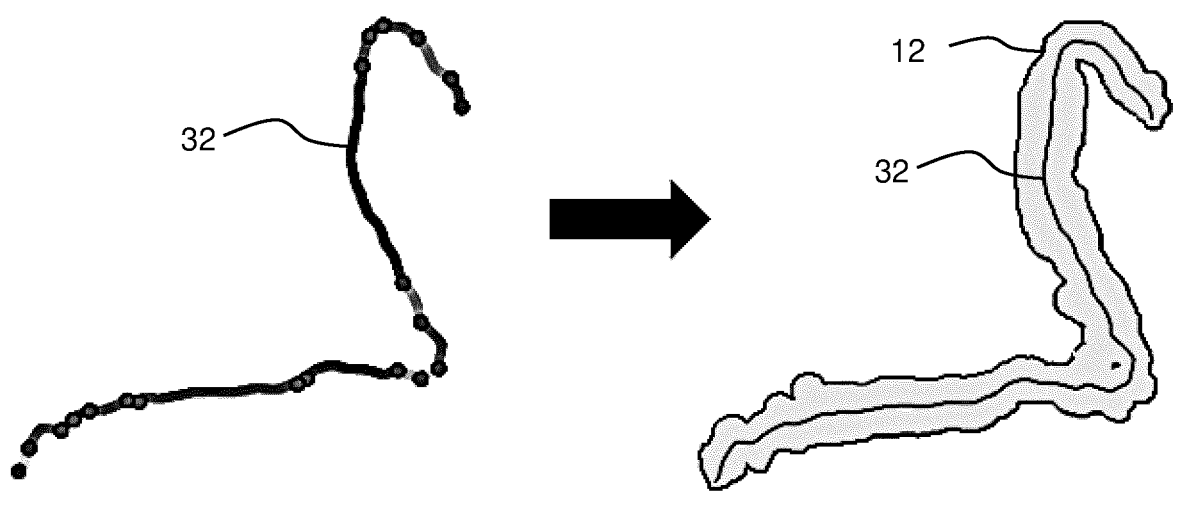
FIG. 4 shows the skeleton path and the skeleton path overlaid within the area outline.

The left image of FIG. 4 shows the skeleton path 32 and the right image shows the skeleton path 32 overlaid within the area outline 12.

The relevant pathology or pathologies in each sample (i.e. within the area outline 12) is then identified.

Figure 5:
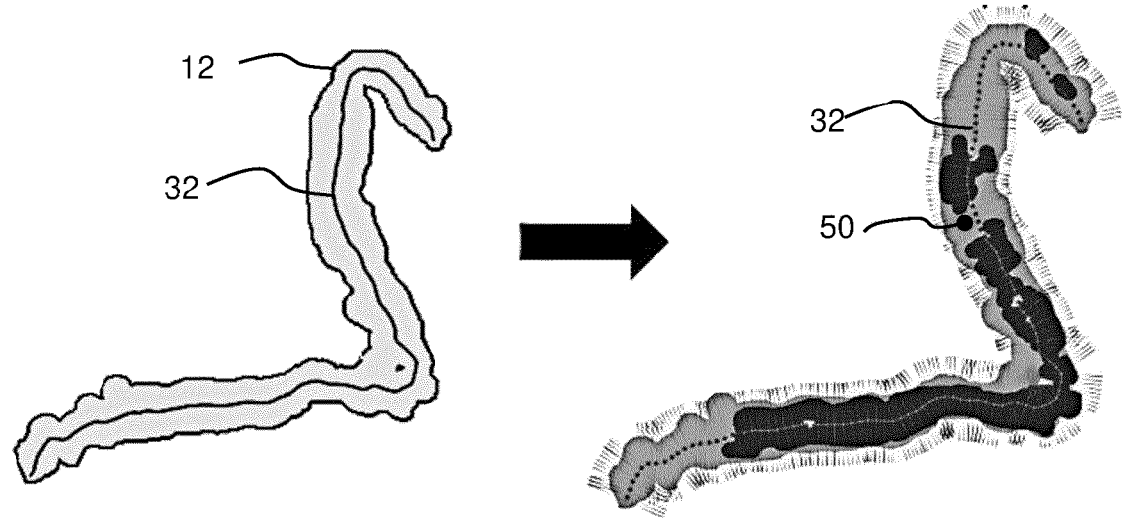
FIG. 5 shows the area outline with the skeleton path and the skeleton path combined with the image of the pathology.

The left image of FIG. 5 shows the area outline 12 with the skeleton path 32 and the right image shows the skeleton path 32 combined with the image 50 of the pathology. Thus, the points along the skeleton path 32 are aligned with the associated pathology information.

Figure 6:
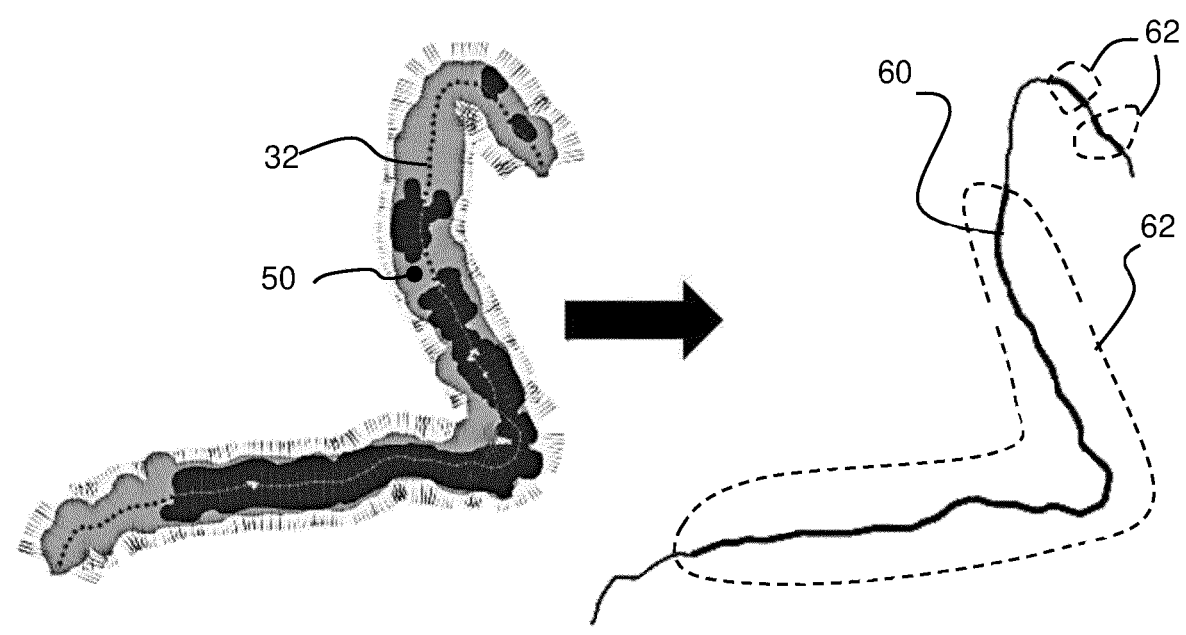
FIG. 6 shows the skeleton path combined with the image of the pathology and shows how the pathology information is projected onto the skeleton path.

The left image of FIG. 6 shows the skeleton path combined with the image 50 of the pathology and the right image shows how the pathology information is projected onto the skeleton path.

The result is a line 60 representing the skeleton path but with different line representations along the line representing different tissue pathologies. For example, the regions 62 may correspond to areas of tumor tissue (e.g. indicated red) whereas the other regions are free of tumor tissue (e.g. indicated green).

The determination of whether tumor tissue or normal tissue is represented along the line may be based on a most sensitive detection approach, by which any tumor tissue detected along a path perpendicular to a point along the line 60 results in that point indicating tumor tissue. If there are multiple pathologies being detected, a weighting scheme may determine which pathology is identified at the point along the line 60.

Figure 7:
FIG. 7 shows a pathology summary for the overall line which can be derived from analysis of the information of FIG. 6.

FIG. 7 shows a pathology summary for the overall line which can be derived from analysis of the information of FIG. 6. This shows the percentage coverage (as a percentage of the line length, 80% in this example), the total biopsy length (7 mm in this example) and the total corresponding physical length of the tumor tissue (5.6 mm in this example).

This example has only two classes (tumor or normal), but there may be more.

Figure 8:
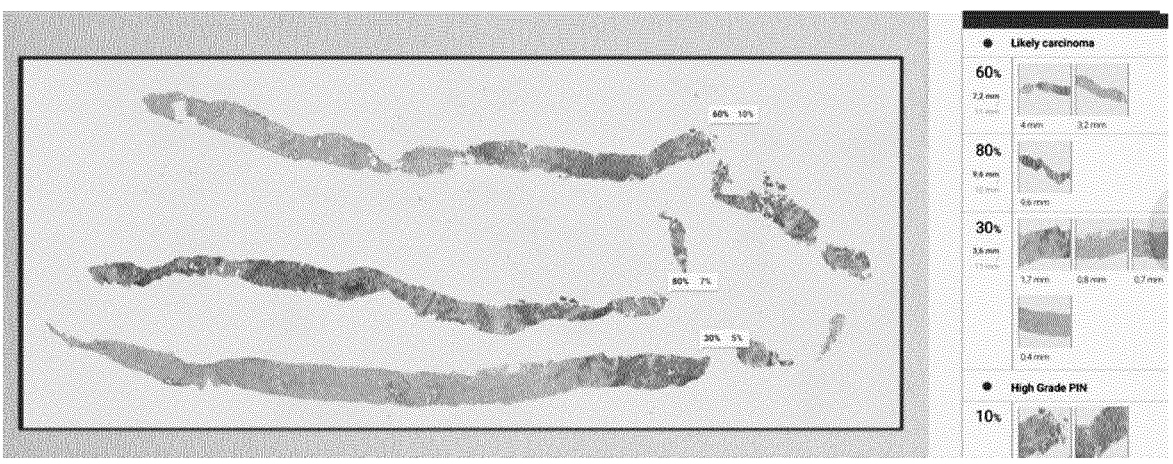
FIG. 8 shows an example of a WSI with multiple samples.

FIG. 8 shows an example of a WSI with multiple samples.

Figure 9:
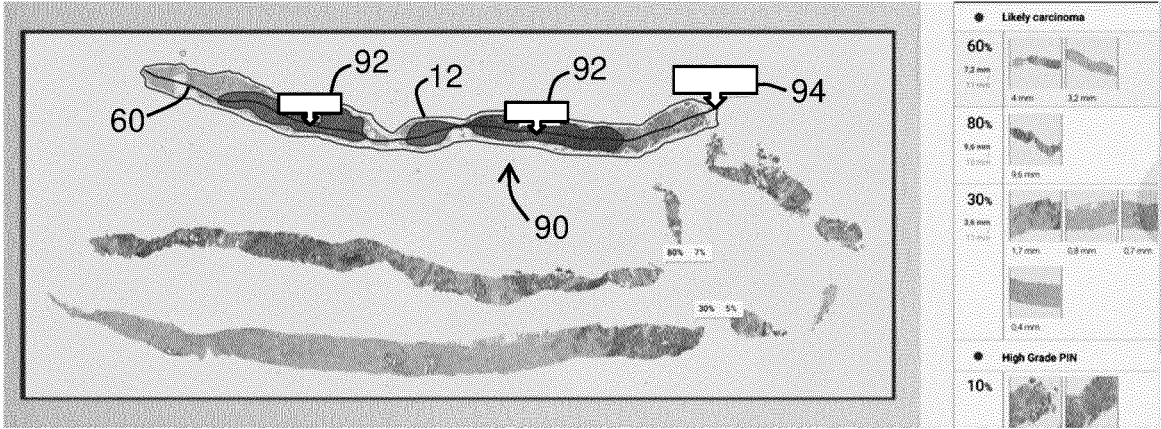
FIG. 9 shows how the image of FIG. 8 is modified using the approach of the invention described above applied to a first sample.

FIG. 9 shows how the image is modified using the approach described above applied to a first sample 90 within the WSI. This image is displayed on a display device.

The line 60 is overlaid over the WSI. It has different colors or different thickness (or other differences such as markers, dot patterns etc.) along its length to represent the different tissue pathologies. In this example the area outline 12 is also represented.

The pathology summary is displayed alongside the line, for example tumor lengths 92 for individual tumor portions along the line length as well as an overall summary 94 (such as in FIG. 7).

The pathologist may zoom in to inspect a particular area of the WSI. The line 60 may then, for example, disappear so that the inspection is not obstructed.

Figure 10:
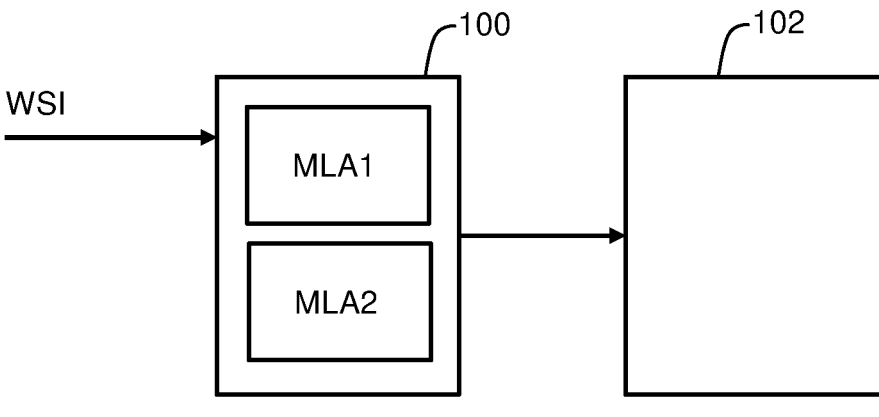
FIG. 10 shows a system for processing a whole slide image of a biopsy.

FIG. 10 shows a system for processing a whole slide image, WSI, of a biopsy such as a core needle biopsy. The system comprises a processor 100 which is adapted to carry out the analysis steps explained above. This involves detecting tissue present in the WSI, creating a skeleton of the shape of the detected tissue, selecting a skeleton path as the longest continuous path through the tissue, determining tissue pathologies of the detected tissue and generating an image.

The image is displayed on a display device 102. It includes the original WSI with the addition of a line representing the skeleton path with different line representations along the line representing different tissue pathologies. A pathology summary for the overall line is also displayed.

A first machine learning algorithm MLA1 is for example used for the tissue detection step. Such algorithms are known.

By way of example, reference is made to the article "tissueloc: Whole slide digital pathology image tissue localization" of Pingjun Chen et. al., Department of Biomedical Engineering, University of Florida DOI: 10.21105/joss.01148.

One or more second machine learning algorithms MLA2 are for example used for detecting tissue pathologies.

By way of example, reference is made to the article "Clinical-grade computational pathology using weakly supervised deep learning on whole slide images" of Gabriele Campanella et. al., Nature Medicine volume 25, pages 1301-1309(2019).

Further reference is made to the article "Automated deep-learning system for Gleason grading of prostate cancer using biopsies: a diagnostic study", of Wouter Bulten et. al., DOI:https://doi.org/10.1016/S1470-2045(19)30739-9.

Algorithms are also well known for skeleton identification from shapes in images. EP 2 772 882 for example discloses the creation of a skeleton from a biopsy image as well as a length determination from the skeleton.

Figure 11:
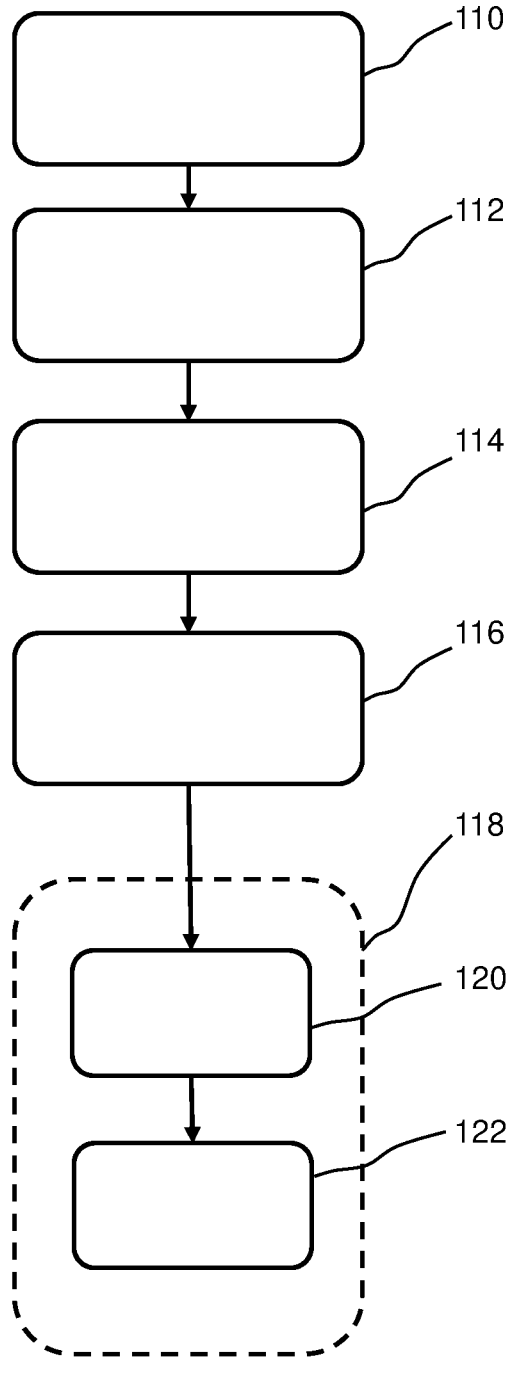
FIG. 11 shows a computer-implemented method for processing a whole slide image of a biopsy.

FIG. 11 shows a computer-implemented method for processing a whole slide image, WSI, of biopsy. The method comprises:

in step 110, detecting tissue present in the WSI relating to one biopsy;

in step 112, creating a skeleton of the shape of the detected tissue;

in step 114, selecting a skeleton path as the longest continuous path through the tissue;

in step 116, determining tissue pathologies of the detected tissue; and in step 118, generating an image for display.

The image is generated by creating in step 120 a line representing the skeleton path with different line representations along the line representing different tissue pathologies and in step 122 creating a pathology summary for the overall line.

As discussed above, the system makes use of a processor to perform the data and image processing. The processor can be implemented in numerous ways, with software and/or hardware, to perform the various functions required. The processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems. (optional)

If the term "adapted to" is used in the claims or description, it is noted the term "adapted to" is intended to be equivalent to the term "configured to".

Any reference signs in the claims should not be construed as limiting the scope.

The invention claimed is:

1. A system for processing a whole slide image, WSI, of a biopsy, comprising;
a display; and
a processor which is adapted to:
    detect, using a first machine learning algorithm, tissue present in the WSI relating to the biopsy;
    create a skeleton of a shape of the detected tissue;
    select a skeleton path as the longest continuous path through the tissue;
    determine one or more tissue pathologies of the detected tissue;
    determine, using a second machine learning algorithm in series with the first machine learning algorithm, a line representing the skeleton path with different line representations along the line representing different determined tissue pathologies;
    determine a pathology summary for the line representing the skeleton path, wherein the pathology summary comprises: (i) a determined biopsy length expressed in a standard unit of length; (ii) a determined pathology length for one or more of the determined tissue pathologies, expressed in the same standard unit of length and/or in a subunit thereof; and (iii) a determined fraction of the line occupied by a particular type of tissue pathology, wherein the determined fraction is determined using the determined biopsy length and the determined pathology length; and
    provide, via the display, the determined pathology summary alongside the determined line.

2. The system as claimed in claim 1, wherein the different line representations comprise different colors or line thickness.

3. The system as claimed in claim 1, wherein the particular type of tissue pathology is tumor tissue.

4. The system as claimed in claim 1, wherein generating an image comprising the line representing the skeleton path comprises overlaying the determined tissue pathologies over the skeleton path, and selecting a representative tissue pathology for a point along the skeleton path.

5. The system as claimed in claim 4, wherein the representative tissue pathology is selected to be tumor tissue if tumor tissue is present at or perpendicular to the point along the line representing the skeleton path.

6. The system of claim 1, wherein the processor is further configured to:

receive input from a viewer of the generated image to zoom in on an identified portion of the displayed image;
    adjust the generated image to zoom, via the display, into the identified portion of the image, wherein the zooming comprises removing the determined line from the image; and
    display the zoomed image.

7. A computer-implemented method for processing a whole slide image, WSI, of a biopsy, comprising:
    detecting, using a first machine learning algorithm, tissue present in the WSI relating to the biopsy;
    creating a skeleton of a shape of the detected tissue;
    selecting a skeleton path as the longest continuous path through the tissue;
    determining, using a second machine learning algorithm in series with the first machine learning algorithm, one or more tissue pathologies of the detected tissue;
    determining a line representing the skeleton path with different line representations along the line representing different tissue pathologies;
    determining a pathology summary for the line representing the skeleton path, wherein the pathology summary comprises: (i) a determined biopsy length expressed in a standard unit of length; (ii) a determined pathology length for one or more of the determined tissue pathologies, expressed in the same standard unit of length and/or in a subunit thereof; and (iii) a determined fraction of the line occupied by a particular type of tissue pathology, wherein the determined fraction is determined using the determined biopsy length and the determined pathology length; and
    providing, via a display, the determined pathology summary alongside the determined line.

8. The method as claimed in claim 7, wherein generating an image comprising the determined pathology summary comprises generating the image with different colors of the line representing the different tissue pathologies.

9. The method as claimed in claim 7, comprising overlaying or juxtaposing the determined tissue pathologies over the skeleton path, and selecting an associated tissue pathology for a point along the skeleton path.

10. The method of claim 7, further comprising:
    receiving input from a viewer of the generated image to zoom in on an identified portion of the displayed image;
    adjusting the generated image to zoom, via the display, into the identified portion of the image, wherein the zooming comprises removing the determined line from the image; and
    displaying the zoomed image.

11. A non-transitory computer readable medium comprising a computer program such that when said program is run on a computer, the computer:
    detects, using a first machine learning algorithm, tissue present in a whole slide image, WSI, relating to the biopsy;
    creates a skeleton of a shape of the detected tissue;
    selects a skeleton path as the longest continuous path through the tissue;
    determines, using a second machine learning algorithm in series with the first machine learning algorithm, tissue pathologies of the detected tissue;
    determines a line representing the skeleton path with different line representations along the line representing different tissue pathologies;

determines a pathology summary for the line representing the skeleton path, wherein the pathology summary comprises: (i) a determined biopsy length expressed in a standard unit of length; (ii) a determined pathology length for one or more of the determined tissue pathologies, expressed in the same standard unit of length and/or in a subunit thereof; and (iii) a determined fraction of the line occupied by a particular type of tissue pathology, wherein the determined fraction is determined using the determined biopsy length and the determined pathology length; and provides, via a display, the determined pathology summary alongside the determined line.

12. The computer readable medium of claim 11, wherein the computer generates the determined pathology summary with different colors of the line representing the different tissue pathologies.

13. The computer readable medium of claim 11, wherein the computer generates an image comprising the determined pathology summary by overlaying or juxtaposing the determined tissue pathologies over the skeleton path, and selecting an associated tissue pathology for a point along the skeleton path.

14. The computer readable medium of claim 11, wherein the computer generates the determined pathology summary by overlaying the determined tissue pathologies over the skeleton path and selecting a representative tissue pathology for a point along the skeleton path.

15. The computer readable medium of claim 14, wherein the representative tissue pathology is selected to be tumor tissue if tumor tissue is present at or perpendicular to the respective point along the line representing the skeleton path.

* * * * *